United States Patent
Fardig et al.

(10) Patent No.: US 10,873,665 B1
(45) Date of Patent: Dec. 22, 2020

(54) CONFERENCE PARTICIPANT LOCATION AND DEVICE IDENTIFICATION

(71) Applicant: Lenovo (Singapore) Pte. Ltd., Singapore (SG)

(72) Inventors: Matthew William Fardig, Boonville, IN (US); Dane Hixson, Orem, UT (US); Tobias Christensen, San Francisco, CA (US); Shawn Sharp, Buhl, ID (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/686,746

(22) Filed: Nov. 18, 2019

(51) Int. Cl.
*H04M 3/56* (2006.01)
*H04N 7/15* (2006.01)
*H04L 12/18* (2006.01)

(52) U.S. Cl.
CPC ........ *H04M 3/565* (2013.01); *H04L 12/1818* (2013.01); *H04L 12/1822* (2013.01); *H04L 12/1831* (2013.01); *H04N 7/152* (2013.01)

(58) Field of Classification Search
CPC ............... H04M 3/565; H04L 12/1818; H04L 12/1822; H04L 12/1831; H04N 7/152

USPC ..................................................... 379/202.01
See application file for complete search history.

(56) References Cited

U.S. PATENT DOCUMENTS

| | | | |
|---|---|---|---|
| 5,802,160 A * | 9/1998 | Kugell ................. | H04M 3/465 370/261 |
| 2004/0235520 A1 * | 11/2004 | Cadiz .................. | H04M 1/2473 455/557 |
| 2014/0104372 A1 * | 4/2014 | Calman .................... | H04N 7/15 348/14.08 |
| 2014/0225897 A1 * | 8/2014 | Sarrazin ............. | G06Q 10/1093 345/467 |
| 2014/0258416 A1 * | 9/2014 | Kurupacheril ...... | H04L 65/4023 709/205 |
| 2016/0148167 A1 * | 5/2016 | Li .......................... | G06Q 10/10 705/7.19 |

* cited by examiner

*Primary Examiner* — Quynh H Nguyen
(74) *Attorney, Agent, or Firm* — Ference & Associates LLC

(57) ABSTRACT

One embodiment provides a method, including: receiving, in a conferencing application, an indication to contact a conference participant; accessing, using a processor, context data associated with the conference participant, wherein the context data identifies a likely location of the conference participant; identifying, at the likely location, an electronic device associated with the conference participant; and contacting the conference participant via the electronic device. Other aspects are described and claimed.

20 Claims, 3 Drawing Sheets

US 10,873,665 B1

CONFERENCE PARTICIPANT LOCATION AND DEVICE IDENTIFICATION

BACKGROUND

Individuals frequently utilize information handling devices ("devices"), for example laptop and/or personal computers, tablet devices, smart phones, and the like, to participate in remote conferencing sessions. More particularly, an individual may utilize their device to connect to a conference or meeting via a conferencing application. Using the conferencing application, an individual may interact and communicate with other conference attendees (e.g., via audible input, text input, a combination thereof, etc.), some or all of which may be located in a different geographic location.

BRIEF SUMMARY

In summary, one aspect provides a method, comprising: receiving, in a conferencing application, an indication to contact a conference participant; accessing, using a processor, context data associated with the conference participant, wherein the context data identifies a likely location of the conference participant; identifying, at the likely location, an electronic device associated with the conference participant; and contacting the conference participant via the electronic device.

Another aspect provides an information handling device, comprising: a processor; a memory device that stores instructions executable by the processor to: receive, in a conferencing application, an indication to contact a conference participant; access context data associated with the conference participant, wherein the context data identifies a likely location of the conference participant; identify, at the likely location, an electronic device associated with the conference participant; and contact the conference participant via the electronic device.

A further aspect provides a product, comprising: a storage device that stores code, the code being executable by a processor and comprising: code that receives, in a conferencing application, an indication to contact a conference participant; code that accesses context data associated with the conference participant, wherein the context data identifies a likely location of the conference participant; code that identifies, at the likely location, an electronic device associated with the conference participant; and code that contacts the conference participant via the electronic device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of identifying a device a conference attendee may be contacted by.

DETAILED DESCRIPTION

Figure 1:
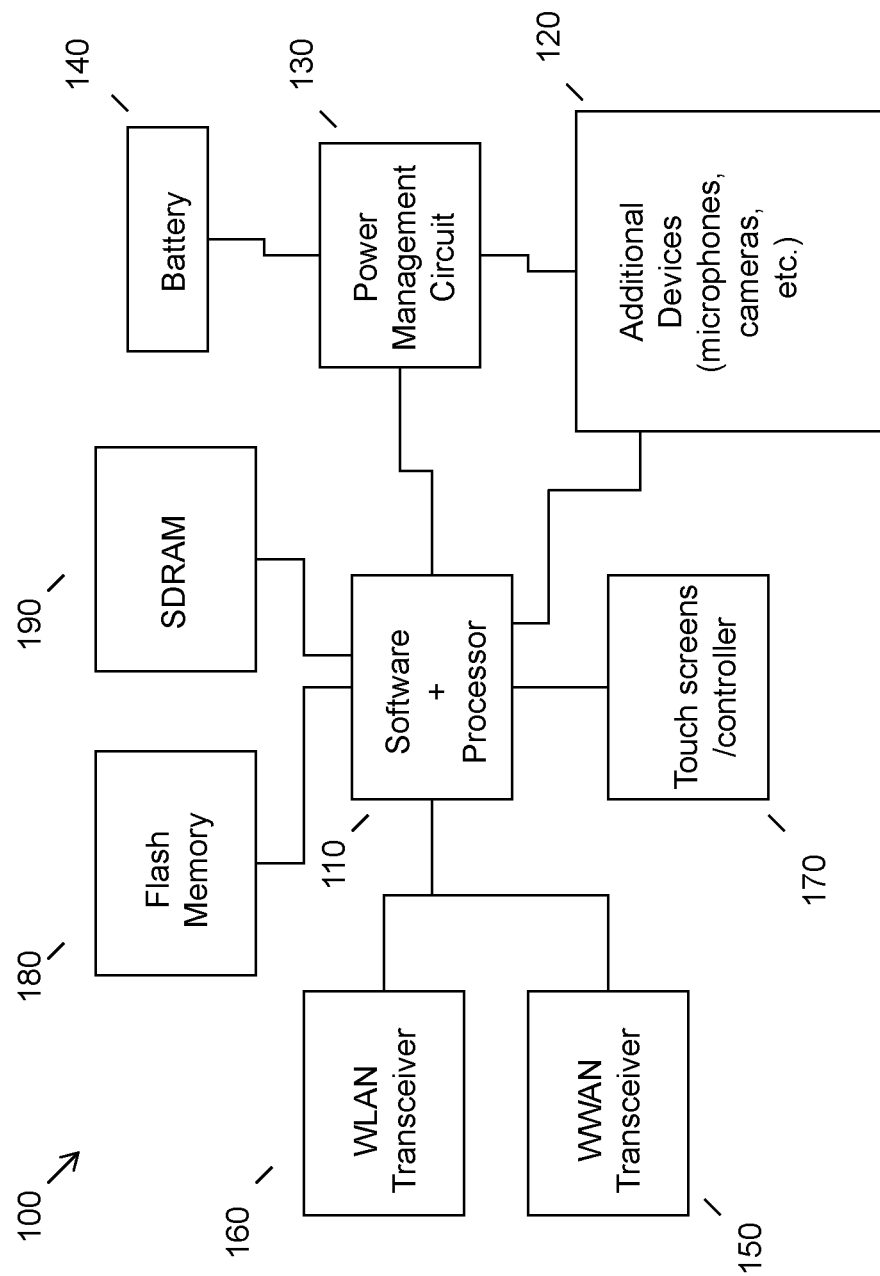
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many conferencing applications contain a "Call Me" feature that may allow other conference attendees to contact the user via another device designated by and associated with the user (e.g., the user's home phone, the user's smart phone, etc.). Conventionally, to initiate this feature, a user is required to manually activate this option from an interface and thereafter provide communication information (e.g., a phone number, etc.) that the conferencing software could use to contact the user's designated device. Once contact is made, the user may participate in the conference through their designated device.

Despite providing individuals an expanded ability to participate in a conference, the foregoing feature has various limitations. For instance, individuals may be unaware how to manually activate this feature or, alternatively, may forget to activate it when they step away from their original conferencing device. Additionally, as another example, an individual may not always be proximate to and/or have access to the specific device they designated (e.g., an individual may have stepped away from their designated device, an individual may have a change in their schedule that separates them from their designated device, an individual may be in a situation where they are unable to interact with their designated device, etc.).

Accordingly, an embodiment provides a method of identifying a device associated with a user that conferencing software can contact to connect a user to a conference. In an embodiment, an indication may be received by a conferencing application (e.g., from an explicit request by an attendee, by an expected attendee absence indication, etc.) to contact a conference participant or an expected conference participant. An embodiment may then access context data associated with the conference participant that identifies a likely location of the conference participant. Thereafter, an embodiment may then identify an electronic device associated with the conference participant at the likely location and contact the conference participant at the electronic device. Such a method may expand a system's abilities to contact a conference attendee.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
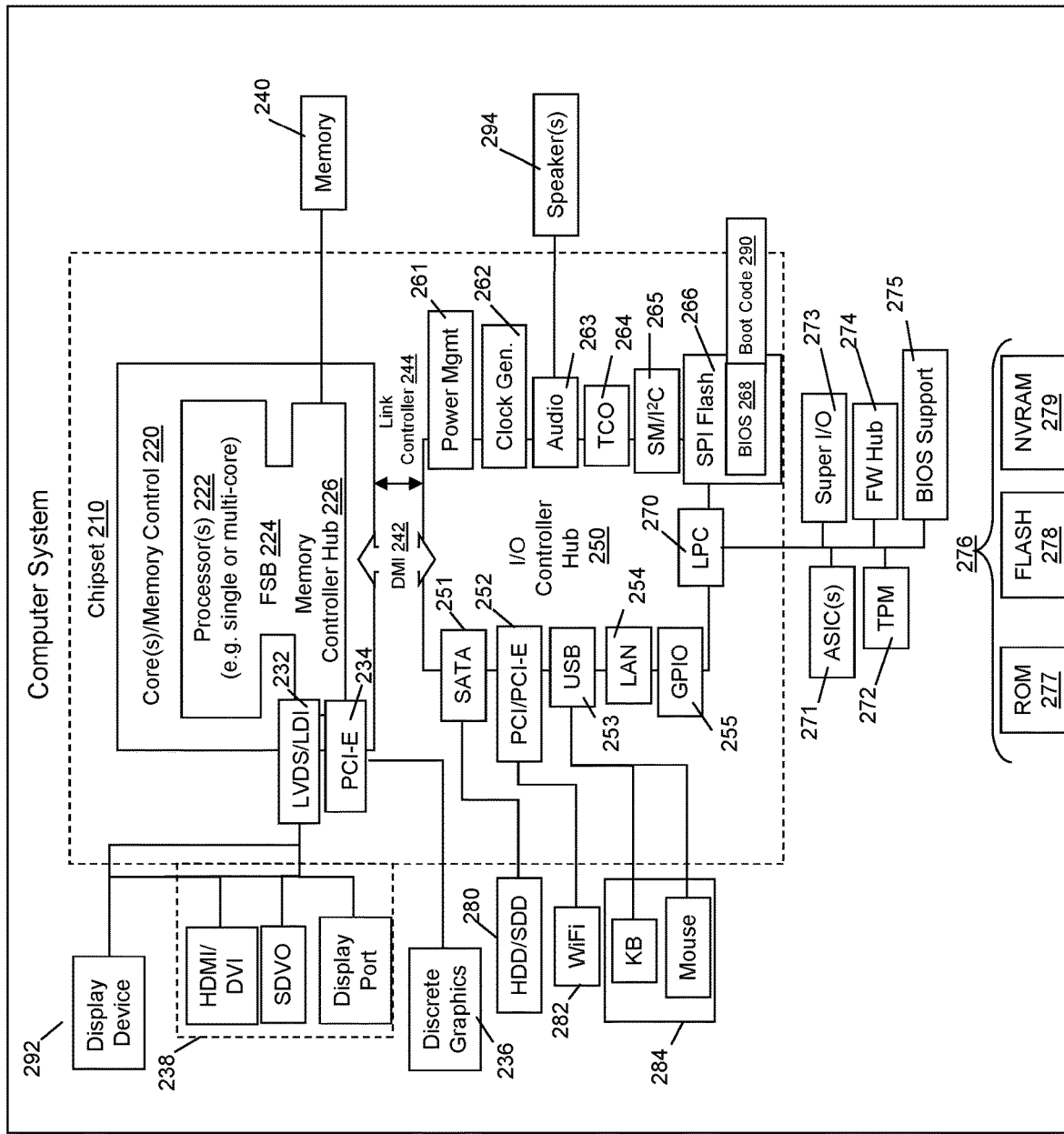
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of supporting a conferencing application. For example, the circuitry outlined in FIG. 1 may be implemented in a smart phone or tablet embodiment, whereas the circuitry outlined in FIG. 2 may be implemented in a laptop.

Figure 3:
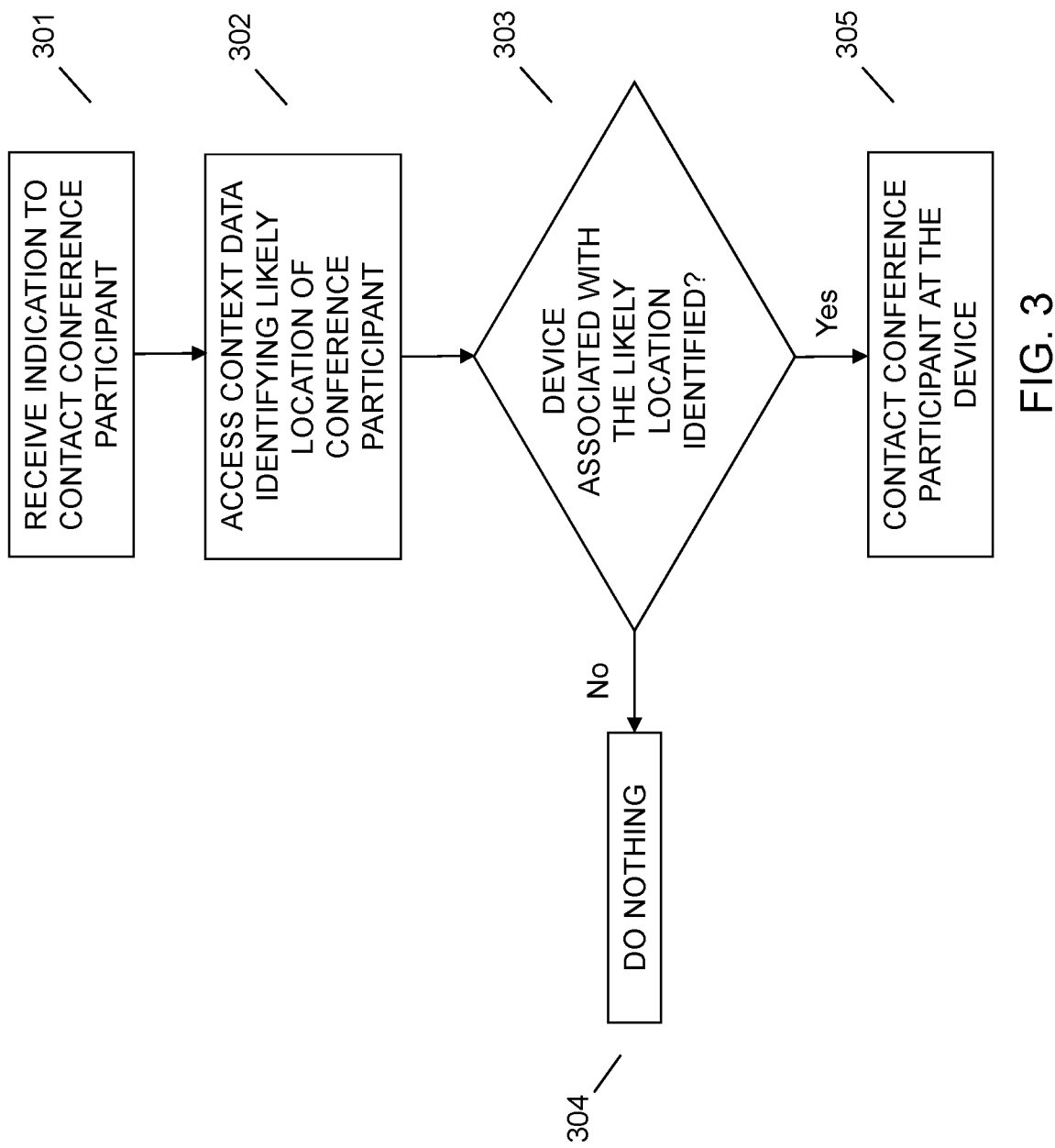

Referring now to FIG. 3, an embodiment may identify a device associated with a conference participant and contact the conference participant on that device. At 301, an embodiment may receive an indication in a conferencing application to contact a conference participant. The conference participant may be an individual who was participating in a conference and thereafter left. Additionally or alternatively, the conference participant may be an individual expected to participate in a scheduled conference (i.e., an expected conference participant). For example, an expected conference participant may be an individual who has signed up or was registered to attend an upcoming conference.

In an embodiment, the indication may be an indication that a conference participant has not joined a scheduled conference for a predetermined period of time. For example, an embodiment may identify that a scheduled conference participant was not present for the beginning of the conference and/or has not joined into the conference after a predetermined period (e.g., 2 minutes, 5 minutes, etc.). Additionally or alternatively, the indication may be an indication that a conference participant has been idle for a predetermined period of time during the conference or has not responded to a directed question from another conference attendee. Additionally or alternatively, the indication may be an indication that a conference participant's presence has not been registered by a predetermined point in the conference. For example, a particular conference may focus on subject matter related to different fields, e.g., professional matters and administrative matters. If a scheduled conference participant who was an administrator was not present at the outset of the portion of the conference related to administrative matters then an indication may be conveyed to the conferencing application.

In an embodiment, the indication may be a command instruction provided by the conference participant. For example, a conference participant may explicitly command the conferencing application to contact the conference participant at a scheduled time or after a certain period of time. This command may occur prior to or during the conference. Additionally or alternatively, the indication may be a command instruction from another conference attendee. For example, another conference attendee may provide an explicit command to the conferencing application to contact a particular conference participant.

At 302, an embodiment may access context data associated with the conference participant that identifies a likely location of the conference participant during a time of the conference. The context data accessed by the conferencing application may be one or more of the following.

In an embodiment, the context data may correspond to calendar data associated with the conference participant. More particularly, an embodiment may have access to a conference participant's calendar information that may allow the conferencing application to make intelligent decisions about the participant. Once this information is obtained, an embodiment may be able to identify the time of day events for a conference participant are scheduled to occur. For example, an embodiment may be able to identify that a conference participant has a scheduled meeting during the time of a conference. Additionally, an embodiment may identify the conference participant's contact preferences for that meeting (e.g., whether a do not disturb is active or not, etc.). In an embodiment, as another example, a conferencing application may be able to identify a location a user is at during the time of the conference (e.g., the vacation location a user is at, another room a user is in, etc.).

In an embodiment, the context data may correspond to prior conferencing habits of the conference participant. For example, an embodiment may be able to identify that a conference participant attends a conference from a specific location at the same time each week (e.g., each Monday at 10 AM from the conference participant's office, etc.). As another example, an embodiment may be able to determine whether a conference participant may be reachable immediately before or after a conference based on prior habit data. For instance, an embodiment may be able to identify that a conference participant almost always remains in their office for approximately 30 minutes after the completion of a specific conference. Accordingly, an embodiment may conclude that the conference participant may be contacted at that location.

In an embodiment, the context data may correspond to a professional role associated with the conference participant. More particularly, available data regarding a conference participant's role in an organization may be utilized to determine a location a user may be during a particular conference. For example, if the conference participant is a member of a remote sales team, then the participant will likely be found at the remote sales office or at another remote location.

In an embodiment, the context data may correspond to conference participant input data. More particularly, a conference participant may designate one or more locations that they can be contacted at during a particular conference and/or at different times of the day. The conference participant may make these designations either before or during the conference. Additionally or alternatively, these designations may not only be made by the conference participant but may also be made by other individuals and/or conference attendees.

At 303, an embodiment may determine whether a device associated with the conference participant is present at the likely location. In an embodiment, a device associated with the conference participant may refer to a device that the conference participant has access to and/or that the conference participant may readily receive communications from.

In an embodiment, the context data may be utilized to determine the device associated with the conference participant. For example, if the context data indicates that the conference participant is out on vacation, an embodiment may determine that the best device to reach the conference participant on while they are on their vacation is their smart phone. As another example, if the context data indicates that the conference participant has just finished a particular meeting from their office and/or that the conference participant can frequently be found in their office for a certain period of time after the meeting, then an embodiment may conclude that the best device to reach the conference participant on immediately after the conference has concluded is on the participant's office phone. In yet another example, if the conference data indicates that the conference participant frequently attends a particular meeting from their home office, then an embodiment may conclude that the best device to reach the participant on is their home phone or their home desktop. Additionally, in a similar example, if a conference participant has attended a majority (e.g., 50 percent, 75 percent, etc.) of prior conferences during work hours using a particular land line, then an embodiment may conclude that there is a high probability that a new conference occurring during work hours would be attended from by the same land line. In a further example, if the context data indicates that the conference participant is a member of a remote sales team and frequently travels, then an embodiment may conclude that the best device to reach the conference participant on is their smart phone. In yet a further example, if a conference participant designates a specific device to contact the participant at during a particular time, then an embodiment may contact the participant at that device.

Responsive to determining, at 303, that a device associated with the conference participant is not present at the likely location, an embodiment may, at 304, take no additional action. Conversely, responsive to determining, at 303, that a device associated with the conference participant is identified at the likely location, an embodiment may, at 305, contact the conference participant on the device. In an embodiment, the conferencing application may make contact with the identified device using one or more available contact methods that are compatible with the device (e.g., a telephone call, an email communication, a video communication, a combination thereof, etc.).

In an embodiment, the conferencing application may continue to transmit contact attempts at predetermined intervals (e.g., every 30 seconds, every minute, etc.) until the conference participant answers the call. Additionally or alternatively, an embodiment may transmit a predetermined number of contact attempts (e.g., 1 attempt, 3 attempts, 5 attempts, etc.). If a conference participant cannot be reached after the predetermined number of contact attempts have been exhausted, an embodiment may cease transmission of additional attempts.

In certain instances, an embodiment may conclude, from the context data, that there are a plurality of (i.e., two or more) likely locations of the conference participant during the time of the conference. In such a scenario, an embodiment may attempt to contact the conference participant by contacting each device known to be associated with the conference participant, at each of the likely locations, substantially simultaneously. Alternatively, an embodiment may first sort the identified likely locations based on the likelihood of the conference participant's presence at each location and thereafter sequentially contact, based on the sorted list, each conference participant associated device at each of the locations until contact can be established or until a predetermined number of contact attempts have been exhausted.

The various embodiments described herein thus represent a technical improvement to conventional methods for contacting a conference participant that has left an ongoing conference or for contacting an expected conference participant for not being present at the conference or a portion of the conference. Using the techniques described herein, an embodiment may first receive an indication to contact a conference participant. An embodiment may then access available context data that indicates a likely location of the conference participant. Thereafter, an embodiment may determine whether a device associated with the conference participant is present at the likely location. Responsive to identifying such a device, an embodiment may attempt to contact the conference participant on that device. Such a technique may expand a conferencing software's ability to reach conference participants that may be absent from a conference.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, in a conferencing application, an indication to contact a conference participant during a conference, wherein the receiving the indication comprises:
      identifying a professional role associated with the conference participant; and
      determining that the conference participant is not present in the conference at a point in the conference related to the professional role;
      wherein the point in the conference is not a beginning of the conference;
   accessing, using a processor, context data associated with the conference participant;

predicting, using the context data, a location of the conference participant;

identifying, at the location, an electronic device associated with the conference participant; and contacting the conference participant via the electronic device.

2. The method of claim 1, wherein the receiving the indication comprises identifying that the conference participant has not joined a conference associated with the conferencing application after a predetermined period of time has elapsed from a beginning of the conference.

3. The method of claim 1, wherein the receiving the indication comprises receiving a contact request from the conference participant or another conference attendee.

4. The method of claim 1, wherein the context data corresponds to calendar data associated with the conference participant.

5. The method of claim 1, wherein the context data corresponds to prior conferencing habits of the conference participant.

6. The method of claim 1, wherein the context data corresponds to the professional role associated with the conference participant and wherein the electronic device is associated with the professional role.

7. The method of claim 1, wherein the context data corresponds to conference participant input data.

8. The method of claim 1, wherein the likely location comprises a plurality of likely locations and wherein the electronic device comprises a plurality of electronic devices and wherein the identifying comprises identifying, at each of the plurality of likely locations, one of the plurality of electronic devices associated with the conference participant.

9. The method of claim 8, wherein the contacting comprises contacting the conference participant on each one of the plurality of electronic devices substantially simultaneously.

10. The method of claim 8, further comprising:
sorting the plurality of likely locations based on a likely presence of the conference participant; and
wherein the contacting comprises contacting the conference participant on each one of the plurality of electronic device sequentially based on the sorting.

11. An information handling device, comprising:
a processor;
a memory device that stores instructions executable by the processor to:
receive, in a conferencing application, an indication to contact a conference participant during a conference, wherein the instructions executable by the processor to receive the indication comprise instructions executable by the processor to:
identify a professional role associated with the conference participant; and
determine that the conference participant is not present in the conference at a point in the conference related to the professional role;
wherein the point in the conference is not a beginning of the conference;
access context data associated with the conference participant
predict, using the context data, a location of the conference participant;
identify, at the location, an electronic device associated with the conference participant; and
contact the conference participant via the electronic device.

12. The information handling device of claim 11, wherein the instructions executable by the processor to receive the indication comprise instructions executable by the processor to identify that the conference participant has not joined a conference associated with the conferencing application after a predetermined period of time has elapsed from a beginning of the conference.

13. The information handling device of claim 11, wherein the context data corresponds to calendar data associated with the conference participant.

14. The information handling device of claim 11, wherein the context data corresponds to prior conferencing habits of the conference participant.

15. The information handling device of claim 11, wherein the context data corresponds to the professional role associated with the conference participant and wherein the electronic device is associated with the professional role.

16. The information handling device of claim 11, wherein the context data corresponds to conference participant input data.

17. The information handling device of claim 11, wherein the likely location comprises a plurality of likely locations and wherein the electronic device comprises a plurality of electronic devices and wherein the instructions executable by the processor to identify comprise instructions executable by the processor to identify, at each of the plurality of likely locations, one of the plurality of electronic devices associated with the conference participant.

18. The information handling device of claim 17, wherein the instructions executable by the processor to contact comprise instructions executable by the processor to contact the conference participant on each one of the plurality of electronic devices substantially simultaneously.

19. The information handling device of claim 11, wherein the instructions are further executable by the processor to:
sort the plurality of likely locations based on a likely presence of the conference participant; and
wherein the instructions executable by the processor to contact comprise instructions executable by the processor to contact the conference participant on each one of the plurality of electronic device sequentially based on the sorting.

20. A non-transitory storage device that stores code, the code being executable by a processor and comprising:
code that receives, in a conferencing application, an indication to contact a conference participant during a conference, wherein the code that receives the indication comprises code that
identifies a professional role associated with the conference participant; and
determine that the conference participant is not present in the conference at a point in the conference related to the professional role;
wherein the point in the conference is not a beginning of the conference;
code that accesses context data associated with the conference participant;
code that predicts, using the context data, a location of the conference participant;
code that identifies, at the location, an electronic device associated with the conference participant; and
code that contacts the conference participant via the electronic device.

* * * * *